(No Model.)

R. D. WRIGHT.
GALVANIC BATTERY.

No. 394,670. Patented Dec. 18, 1888.

WITNESSES:
Wm. Rosenbaum
F. C. Gruen

INVENTOR,
Robert D. Wright
BY
W. J. Johnston
ATTORNEY.

UNITED STATES PATENT OFFICE.

ROBERT D. WRIGHT, OF KIRKWOOD, MISSOURI.

GALVANIC BATTERY.

SPECIFICATION forming part of Letters Patent No. 394,670, dated December 18, 1888.

Application filed May 14, 1888. Serial No. 273,768. (No model.)

*To all whom it may concern:*

Be it known that I, ROBERT D. WRIGHT, a citizen of the United States, residing at Kirkwood, in the county of St. Louis and State of Missouri, have invented certain new and useful Improvements in Galvanic Batteries; and I do hereby declare that the following is a full, clear, and exact description of my invention, such as will enable others skilled in the art to which it appertains to make and use the same.

My invention relates to galvanic batteries, the object being to provide a battery which, by the simple addition of acids, will last a very long time, the battery-cells being provided with a plurality of plates or sheets which are of the same material, but which are successively utilized and a new plate or sheet placed into use whenever the old one is worn out.

Another object is to construct a battery so that the spent liquids or acids will pass out or filter as soon as they have lost their strength, thus preventing needless pollution of the active material.

My construction is adapted to be used either as an open or closed circuit-battery.

My improved battery may be used either with or without an outer jar. This zinc or positive element of the battery is in the form of sheets or layers which surround the porous cup and are pressed continually against the same by elastic bands, or in any other manner.

In a carbon battery I form the porous cup of carbon, making it one of the elements of the battery. I then place next to this on the outside a layer of asbestus or other absorbing non-conductor. Next to this non-conductor I place several layers of sheet-zinc, which are in the form of segments, and bind and hold them with bands of rubber.

Figure 1:
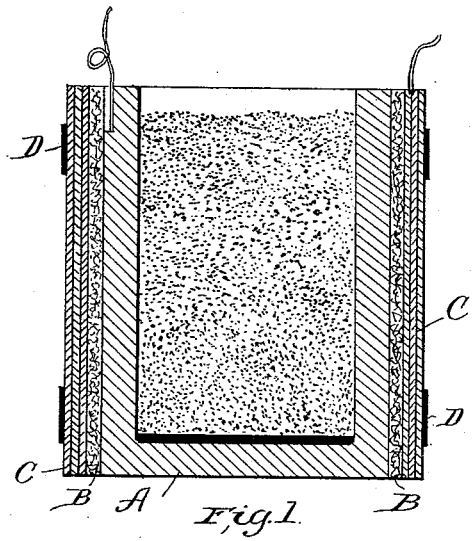
Figure 2:
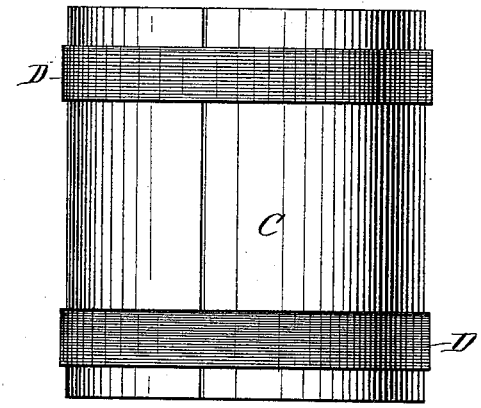
Figure 3:
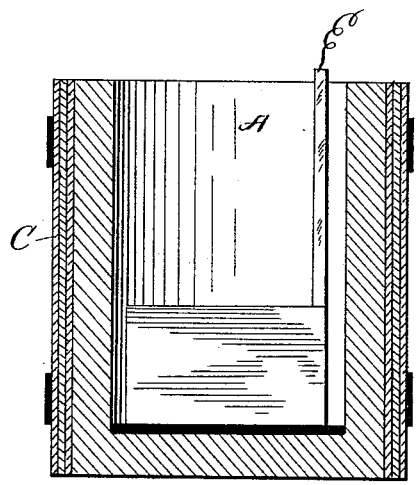

In the accompanying drawings, Figure 1 represents a central section of my improved battery, the construction being adapted for the use of carbon. Fig. 2 is an elevation of the same. Fig. 3 is a section of a sulphate of copper and zinc battery constructed according to my invention.

Referring to the drawings by letter, A represents a porous cup constructed (when used as a carbon battery) of carbon. The bottom is lined with a layer of pitch to prevent the downward passage of the liquid. This cup may ordinarily be filled with pulverized carbon or with sand or other absorbent material. The cup is surrounded on the outside by a layer of asbestus or other insulating material, B, which will absorb moisture. This is a continuous layer and insulates the carbon cup from the sheets of zinc C. The sheets of zinc are preferably segmental, and may be of any number desired—say three or more. They are held in contact with the asbestus B by rubber bands D. No outer jar is required. The connections are made with the carbon cup and with the zinc in any manner desired.

It will be seen, now, that the battery is complete except for the addition of the acids. These are poured into the carbon cup, saturating the pulverized material which it contains, penetrating its side walls and saturating the layer of asbestus; thence it attacks the zinc, after which it percolates toward the bottom, and finally passes out after it has spent its force.

In the other form of battery, where sulphate-of-copper solution is used, the porous cup is filled with water and sulphate-of-copper crystals. The solution percolates through the walls of the cup and attacks the zinc, which may or may not be separated from the cup by non-conducting material. The solution, after acting upon the zincs, passes out in the form of sulphate of zinc through the bottom of the cell, and may be collected or not, as desired. This is an advantageous point, as the sulphate of zinc has some commercial value and may thus be saved.

Any number of zinc layers may be placed in position and held by the rubber bands, and it will thus be seen that the process of amalgamation need be performed only at long intervals. When the inner layer of zinc has become exhausted, the rubber forces in the next one and brings it in contact with the solution coming through the porous cup. I have thus described a compound battery which contains all the elements to produce an electric current by the application of certain fluids. As before stated, it can be used with an exterior jar or not. It is, however, preferable to use it without the said jar and thus allow the drainage to pass away, so as not to act on the zinc after the fluid loses its power, and also not to impair the remaining fluid in the cell.

It will be observed that after the electrical qualities of the exciting-fluid have been obtained the said fluid is automatically discharged, and by the addition of fresh fluid at regular intervals the battery may be used continuously to its full capacity.

I do not confine myself to any particular shape or dimensions of porous cup, or other parts of the herein-described battery, as many modifications may be made which will not affect the principle of the invention.

What I claim as my invention is—

1. In a galvanic battery, the combination, with a porous cup, of one or more layers of zinc surrounding the same and having a layer of absorbent material between the cup and zincs.

2. In a galvanic battery, the combination, with a porous cup, of a plurality of layers of zinc and one or more rubber or other elastic bands embracing the zinc and cup and forcing said zinc inward toward the cup, substantially as described.

3. In a galvanic battery, the combination, with a porous cup, of several plates or sheets of zinc held in contact with said cup by elastic bands, the construction being such that liquids may flow downward between the zinc and cup, and finally out through the bottom of the structure.

4. In a galvanic battery, the combination, with a porous cup having its bottom covered with a layer of pitch or other water-proof material, of a series of zinc plates surrounding said cup and pressed constantly against the same by surrounding rubber bands, substantially as described.

In witness whereof I have hereunto signed my name in the presence of two subscribing witnesses.

ROBT. D. WRIGHT.

Witnesses:
   GEO. KEEGE,
   MARIE C. JACOBI.